(12) United States Patent
Haas et al.

(10) Patent No.: US 7,241,908 B2
(45) Date of Patent: Jul. 10, 2007

(54) PROCESS FOR THE DIRECT SYNTHESIS OF HYDROGEN PEROXIDE

(75) Inventors: Thomas Haas, Frankfurt (DE); Guido Stochniol, Haltern (DE); Robert Jahn, Rodenbach (DE)

(73) Assignee: Degussa AG, Düsseldorf (DE)

( * ) Notice: Subject to any disclaimer, the term of this patent is extended or adjusted under 35 U.S.C. 154(b) by 50 days.

(21) Appl. No.: 11/124,059

(22) Filed: May 9, 2005

(65) Prior Publication Data

US 2005/0276744 A1    Dec. 15, 2005

(30) Foreign Application Priority Data

May 11, 2004    (DE) .................. 10 2004 023 766

(51) Int. Cl.
*C01B 15/029*    (2006.01)
*C07D 301/12*    (2006.01)

(52) U.S. Cl. .................. 549/531; 423/584; 562/418; 568/568; 568/803

(58) Field of Classification Search .................. 423/584
See application file for complete search history.

(56) References Cited

U.S. PATENT DOCUMENTS

| | | | |
|---|---|---|---|
| 4,564,514 A * | 1/1986 | Drauz et al. ............. | 423/589 |
| 6,168,775 B1 | 1/2001 | Zhou et al. ............... | 423/584 |
| 6,375,920 B2 | 4/2002 | Fischer et al. ............ | 423/584 |
| 6,387,346 B1 | 5/2002 | Bertsch-Frank et al. .... | 423/584 |
| 6,500,969 B1 | 12/2002 | Zhou et al. ............... | 549/531 |
| 6,504,040 B1 | 1/2003 | Vogtel et al. ............. | 548/525 |
| 6,576,214 B2 * | 6/2003 | Zhou et al. ............... | 423/584 |
| 6,649,140 B2 * | 11/2003 | Paparatto et al. .......... | 423/584 |
| 6,764,671 B2 * | 7/2004 | Haas et al. ............... | 423/584 |
| 6,783,748 B2 * | 8/2004 | Tanaka et al. ............. | 423/584 |
| 6,822,103 B2 * | 11/2004 | Escrig et al. ............. | 549/531 |
| 2001/0003578 A1 | 6/2001 | Fischer et al. ............ | 423/584 |
| 2002/0106320 A1 | 8/2002 | Zhou et al. ............... | 423/584 |
| 2003/0095917 A1 * | 5/2003 | Wilcox et al. ............. | 423/584 |
| 2003/0162657 A1 * | 8/2003 | Paparatto et al. .......... | 502/339 |
| 2003/0180212 A1 * | 9/2003 | Huckins ................... | 423/584 |

FOREIGN PATENT DOCUMENTS

| | | |
|---|---|---|
| DE | 196 42 770 | 4/1998 |
| DE | 198 57 137 | 6/2000 |
| DE | 199 12 733 | 9/2000 |
| EP | 0 160 195 | 12/2001 |
| EP | 1 160 196 | 12/2001 |
| EP | 0 978 316 | 4/2003 |
| EP | 1 344 747 | 9/2003 |
| WO | WO 02/085875 | 10/2002 |
| WO | WO 03/082458 | 10/2003 |

OTHER PUBLICATIONS

English language abstract for DE 196 42 770, Reference B7 above.
English language abstract for DE 198 57 137, Reference B8 above.
English language abstract for DE 199 12 733, Reference B9 above.

* cited by examiner

*Primary Examiner*—Wayne A. Langel
(74) *Attorney, Agent, or Firm*—Michael A. Sanzo; Law Offices of Michael A. Sanzo, LLC

(57) ABSTRACT

The invention is directed to the preparation of organic or aqueous-organic hydrogen peroxide solutions by direct synthesis from a non-explosive gaseous mixture containing hydrogen and oxygen. The process is carried out in the presence of a noble metal catalyst, using a reaction medium containing a halide and a strong acid. It can be performed in a stainless steel reactor without corrosion occurring to the reactor material if, during the reaction, the surface of the stainless steel is, at no place, in permanent contact with the gaseous mixture passing through the reactor.

20 Claims, No Drawings

PROCESS FOR THE DIRECT SYNTHESIS OF HYDROGEN PEROXIDE

CROSS REFERENCE TO RELATED APPLICATIONS

The present application claims priority to German application no. 10 2004 023 766.2, filed on May 11, 2004, which is incorporated in its entirety herein by reference.

FIELD OF THE INVENTION

The present invention relates to a process for the preparation of an organic or aqueous-organic hydrogen peroxide solution by direct synthesis from a gaseous mixture containing hydrogen and oxygen, in the presence of a noble metal catalyst. The process may be carried out in a stainless steel reactor without corrosion occurring to the reactor material.

BACKGROUND OF THE INVENTION

It is known that hydrogen peroxide may be prepared by direct synthesis from gaseous mixtures containing hydrogen and oxygen by reacting the gaseous mixture on a noble metal catalyst in the presence of a liquid aqueous, aqueous-organic or organic reaction medium. The organic or aqueous-organic hydrogen peroxide solutions obtainable by the direct synthesis process are of interest as oxidizing agents for the catalytic oxidation of organic compounds.

One problem with the direct synthesis of hydrogen peroxide is that the noble metal catalysts used have an unwanted catalytic activity in decomposing hydrogen peroxide to water and oxygen. This activity can be inhibited by adding a sufficient concentration of a strong acid and halide to the liquid reaction medium. However, the addition of acid and halide causes the reaction medium to become strongly corrosive towards metallic materials, particularly stainless steel. One problem that this creates is that, although metal reactors are desirable for use in processes on an industrial scale because of their ability to dissipate heat, corrosion of the reactor material gives rise to safety problems. This is especially true if the direct synthesis is carried out at elevated pressure, which is desirable for achieving a high space-time yield. In addition, metal ions dissolved out of the reactor material by corrosion have an adverse effect on the stability of the hydrogen peroxide solutions prepared, and may cause unwanted secondary reactions when the solutions are used in oxidation reactions.

The problem of corrosiveness due to the simultaneous presence of acid and halide ions in the reaction medium is known from EP-A 0 978 316 and EP-A 1 344 747, both of which suggest carrying out the reaction in the presence of special catalysts in which the noble metal is applied to a catalyst support containing acid groups. Although the use of the proposed catalyst supports makes it possible to lower the acid concentration in the reaction medium, it is still necessary to add 3 to 34 ppm of HBr in order to effectively inhibit the decomposition activity of the catalyst, and therefore the liquid reaction mixture remains corrosive. Because of this corrosiveness, EP-A 0 978 316 suggests using autoclaves which are either made of the particularly corrosion-resistant alloy Hastelloy C or are made of stainless steel and have a glass insert to contain the liquid reaction medium. The use of these materials or inert reactor coatings, for example glass or PTFE, increases production costs and may make the process uneconomical. There is therefore a need for a process for the direct synthesis of hydrogen peroxide in the presence of acid and halide that can be carried out in a reactor made of a commercially available stainless steel material without corrosion.

It is known from DE-A 196 42 770 to carry out direct synthesis reactions in a methanolic reaction medium containing 0.4 wt. % of sulfuric acid, 0.1 wt. % of phosphoric acid and 6 ppm of bromide in the form of sodium bromide, and to use a shaped body made of V4A steel fabric coated with palladium metal as the catalyst. Because of the coating, the V4A steel fabric used as the catalyst support is not in direct contact with the corrosive reaction mixture. The document does not teach how to avoid corrosion of stainless steel on direct contact with the corrosive reaction mixture.

DE-A 198 57 137 describes the direct synthesis of hydrogen peroxide in a methanolic reaction medium containing 0.3 wt. % of sulfuric acid, 0.03 wt. % of phosphoric acid and 5 ppm of bromide in the form of sodium bromide. The reaction is carried out in a V4A steel autoclave operated as a continuous stirred tank. The autoclave is operated in this case with a gas stirrer to disperse the gaseous mixture in the liquid reaction medium. For a construction of this type, the autoclave has to contain a gas cushion in the region of the cover so that the gas stirrer can suck in gas and distribute it in the reaction mixture. '137 does not disclose the period of time over which the direct synthesis was carried out in the V4A stirred autoclave. The document also does not disclose the extent to which corrosion occurred on the reaction vessel or how to avoid corrosion.

WO 03/082458 describes a process for the direct synthesis of hydrogen peroxide in which a gaseous mixture and a liquid reaction medium are passed at high velocity through a tubular reactor so that a coherent gas phase does not form in the reactor. As materials suitable for the reactor, the document mentions duplex stainless steels having a PREN number of more than 34. Since duplex stainless steels have a substantially higher chromium and molybdenum content than commercially available austenitic stainless steels, they are more expensive and also less readily available. Because of the necessary high flow velocity of 1.2 m/s or more, the process described in WO 03/082458 also requires particularly long and hence expensive reactors. Thus, for example, a pressure reactor with a length of more than 2000 m is used in Example 1.

DESCRIPTION OF THE INVENTION

It has now been found that the direct synthesis of hydrogen peroxide from a gaseous mixture containing hydrogen and oxygen, in the presence of a liquid reaction medium containing bromide and a strong acid, can be carried out in a reactor made of commercially available stainless steel without corrosion occurring on the reactor material, if the reaction is carried out in such a way that, during the reaction, the surface of the stainless steel is at no place in permanent contact with the gaseous mixture passing through the reactor. The possibility of avoiding corrosion of the stainless steel reactor material by limiting the contact time between the reactor material and the gaseous mixture passing through the reactor is surprising to those skilled in the art and could not be anticipated from the state of the art because it has usually been assumed that corrosion is caused by corrosive liquid medium and will always occur if the liquid reaction medium is in contact with the stainless steel.

The invention therefore provides a process for the preparation of an organic or aqueous-organic hydrogen peroxide solution by direct synthesis, wherein a non-explosive gaseous mixture containing hydrogen and oxygen, and a liquid reaction medium containing at least one water-soluble organic solvent, a bromide and/or iodide in a concentration of $10^{-6}$ to $10^{-2}$ mol/kg and a strong acid in a concentration of 0.0001 to 0.5 mol/kg, are passed over a fixed bed arranged in the reactor and consisting of supported catalyst particles or a mixture of catalyst-containing and catalyst-free particles, characterized in that the reaction is carried out in a stainless steel reactor and, during the reaction, the surface of the stainless steel is at no point in permanent contact with the gaseous mixture passing through the reactor.

The invention also provides a process for the catalytic oxidation of an organic substrate from the group comprising olefins, aromatic hydrocarbons that can carry substituents from the group comprising alkyl, alkoxy and hydroxyl, and carbonyl compounds, with an organic or aqueous-organic hydrogen peroxide solution, in the presence of an oxidation catalyst from the group comprising titanium silicalites and vanadium, molybdenum and/or tungsten compounds, wherein the organic or aqueous-organic hydrogen peroxide solution used has been obtained according to the process of the invention.

To be in "permanent contact" is understood here as meaning that the surface of the stainless steel is not wetted by the liquid reaction medium for a prolonged period of time, during which it is in direct contact with the gas phase. At no point in the present process does a surface of the stainless steel reactor remain unwetted by the liquid medium for longer than 30 minutes. The surface of the stainless steel preferably remains unwetted by the liquid medium for no longer than 30 seconds and particularly preferably for no longer than 1 second. In the most preferred embodiment, the liquid reaction medium is passed through the reactor in such a way that the surface of the stainless steel is continuously wetted by the liquid reaction medium at every point.

The process according to the invention is preferably carried out in such a way that the reactor is flooded with the liquid reaction medium, and the gaseous mixture is distributed in the form of gas bubbles in the liquid reaction medium contained in the reactor. The reactor is constructed and operated so that gas cushions, in which the gaseous mixture is in permanent contact with the reactor wall or with stainless steel reactor fittings, do not form in the reactor. An example of an embodiment according to the invention is to carry out the reaction in a bubble column, the liquid reaction medium and the gaseous mixture being fed into the bottom part of the bubble column and the organic or aqueous-organic hydrogen peroxide solution prepared, together with unreacted gas, being withdrawn at the highest point of the bubble column reactor. The bubble column reactor in this case contains a fixed bed of supported catalyst particles or a mixture of catalyst-containing and catalyst-free particles, the fittings that hold the fixed bed of catalyst in the reactor being designed so that at no point does a gas cushion form which is in permanent contact with the reactor wall or with stainless steel fittings.

In an alternative embodiment, the process according to the invention can also be carried out in a trickle bed reactor in which suitable devices ensure that the entire reactor wall always remains wetted by the liquid reaction medium. Preferably, for this purpose, at least part of the liquid reaction medium fed into the reactor is sprayed into the top end of the reactor in such a way that the entire inner wall of the reactor is wetted by sprayed reaction medium running down said wall.

As used herein, the term "stainless steel" is understood as meaning any metallic material which has iron as the main constituent and also has a chromium content in the range from 16.5 to 19 wt. %, a nickel content in the range from 10.5 to 15 wt. % and a molybdenum content of up to 4 wt. %. Those skilled in the art are familiar with such stainless steels as materials for chemical reactors, for example under the DIN material references 1.4401, 1.4404, 1.4406, 1.4429, 1.4541 and 1.4571 and the AISI material references 316, 316L, 316N and 316Ti.

In the process according to the invention, the organic solvents used in the liquid reaction medium are capable of dissolving the hydrogen peroxide formed in the direct synthesis and the water formed as by-product. These organic solvents are preferably ketones and alcohols having up to 6 carbon atoms, especially up to 4 carbon atoms. Particularly preferred solvents for carrying out the direct oxidation are methanol, ethanol, n-propanol and n-butanol, especially methanol.

With regard to the use of the hydrogen peroxide solution as an oxidizing agent for the oxidation of organic compounds, it is advantageous, where possible, for the water content of the organic solvent to be kept low. Preferably, the water content of the organic medium is limited to a maximum of 20 wt. %, and more preferably to a maximum of 10 wt. %. Particularly preferably, the solvent used is methanol with a water content of 2 to 10 wt. %.

In addition to organic solvent, and optionally water, the liquid reaction medium used for the direct synthesis also contains a strong acid and a halide in an amount sufficient to inhibit the decomposition of hydrogen peroxide on the noble metal catalyst. In terms of the invention, strong acids are any acids with a $pK_a$ of less than 3 and preferably a $pK_a$ of less than 2. Mineral acids, such as sulfuric acid, phosphoric acid and nitric acid, are particularly suitable. Sulfonic acids and phosphonic acids that are soluble in the medium can also be used. The acid concentration in the organic or aqueous-organic liquid medium ranges from 0.0001 to 0.5 mol/kg, preferably from 0.001 to 0.2 mol/kg and particularly preferably from 0.01 to 0.1 mol/kg. If the acid concentration is above the claimed range, corrosion by the liquid phase can also occur; if it is below the claimed range, the hydrogen peroxide selectivity achieved is normally no longer sufficient, i.e., there is no longer sufficient inhibition of decomposition. Lower acid concentrations are preferred in view of the subsequent use of the hydrogen peroxide solution formed.

The halides used are bromide and iodide, with bromide being preferred. The liquid reaction medium contains the halide at a concentration ranging from $10^{-6}$ to $10^{-2}$ mol/kg, preferably from $10^{-5}$ to $10^{-3}$ mol/kg and particularly preferably from $10^{-5}$ to $5 \cdot 10^{-4}$ mol/kg. If the halide concentration is above the claimed range, the stability of the hydrogen peroxide solution prepared is reduced; if it is below the claimed range, the hydrogen peroxide selectivity achieved is normally no longer sufficient. Lower halide concentrations are preferred in view of the subsequent use of the hydrogen peroxide solution formed. The halide can be added to the reaction medium in the form of an alkali metal or alkaline earth metal salt, preferably NaBr or NaI. The halide can also be added in the form of the hydrohalic acid, for example HBr or HI.

The liquid reaction medium is preferably fed into the reactor at a rate such that the cross-sectional loading by the liquid phase in the reactor ranges from 0.3 to 200 m/h, based on the unloaded cross section of the reactor. The cross-sectional loading ranges preferably from 0.3 to 20 m/h and particularly preferably from 1 to 10 m/h. In the preferred range of cross-sectional loading, hydrogen peroxide solutions with a hydrogen peroxide content of 4 to 12 wt. % can be prepared, a high hydrogen peroxide selectivity, a high space-time yield and a long catalyst life being achieved at the same time.

The composition of the gaseous mixture containing hydrogen and oxygen that is passed over the fixed bed containing the catalyst is chosen so that the gaseous mixture is not explosive. The mixture should fall outside the explosion limit, even when the solvent partial pressure that develops is taken into account. Advantageously, the gaseous mixture also contains one or more inert gases, preferably nitrogen. The hydrogen content of the gaseous mixture is limited to a maximum of 6 vol. %, and preferably a maximum of 5 vol. %. In particular, the hydrogen content should preferably range from 3 to 5 vol. %. The oxygen content of the gaseous mixture can be stoichiometric or hyperstoichiometric and preferably ranges from 10 to 50 vol. %, especially from 15 to 40 vol. %. The hydrogen and oxygen are preferably fed into the reactor separately. The oxygen can be introduced either in pure form, in the form of air, or in the form of oxygen-enriched air. The residual gas obtained at the outlet of the reactor can be wholly or partially recycled into the reactor in order to reduce the cost of recovering unreacted hydrogen.

The process according to the invention can be carried out using any catalysts known from the state of the art for the direct synthesis of hydrogen peroxide and containing one or more noble metals, in the form of a fixed bed. Examples of suitable catalysts are known from EP-A 1 160 196 or U.S. Pat. No. 6,168,775. It is also possible to use other commercially available noble metal catalysts, for example 3% Pd Degussa 105XR/W dried.

The catalytically active component of the catalyst contains one or more noble metals in pure form or in the form of alloys. Preferred noble metals are the platinum metals, especially palladium and platinum, as well as gold. Elements from the group comprising Rh, Ru, Ir, Cu and Ag can also be present. Particularly preferred catalysts contain as catalytically active metals at least 80 wt. % of palladium and 0 to 20 wt. % of platinum, as well as 0 to 20 wt. % of gold and/or 0 to 5 wt. % of silver in alloyed or unalloyed form.

The catalysts can be either unsupported or supported, the latter being preferred. The catalytically active noble metal(s) can be present on the surface of a support material and/or be arranged as particles uniformly distributed within a bed of inert support material.

The support materials are particulate materials such as powders, extrudates, granules or other shaped bodies formed from a pulverulent material. It is preferable to use oxide-based or silicate-based support materials, especially aluminium oxide, silica, titanium dioxide, zirconium dioxide and zeolites. An alternative possibility is to use carbon-based supports, for example activated carbon supports.

It is possible to mix the catalytically active component, present in very finely divided form, with a pulverulent support material, plasticize and shape the mixture and consolidate the shaped bodies by calcination. It is also possible to impregnate an already prefabricated, shaped support with a suspension containing the very finely divided, catalytically active component to give a so-called shell catalyst. When the catalytically active material is applied onto or into the support material, known binders, such as water glass, calcium oxalate, boric acid and other glass-forming compositions, can also be present. The application of the catalytically active material to a support material is conventionally followed by a calcination step at 300 to 600° C. Finally, the catalytically active supported catalysts can also be obtained by impregnation of the support with a solution containing a compound of the catalytically active metals, followed by hydrogenation, calcination and washing steps.

The size of the particles in the fixed bed can vary within wide limits and especially in the range from 0.1 to 10 mm. When using mixtures of catalytically active and inactive particles, it is also possible to use catalytically active particles with a size ranging from 0.02 to 0.1 mm. A small particle size leads to a larger pressure drop; however, if the particle size is too large, the catalytically active surface area decreases. Particle sizes ranging from 0.1 to 5 mm, especially from 0.1 to 2 mm and particularly preferably from 0.1 to 0.5 mm lead to high productivities.

As regards pressure and temperature, the reaction conditions correspond to those known from the state of the art. Thus, the reaction temperature generally ranges from 0 to 90° C., the preferred temperature range being from 20 to 50° C. The pressure generally ranges from atmospheric pressure or a slightly reduced pressure to about 10 MPa. The reaction is preferably carried out at a pressure ranging from 0.5 to 5 MPa.

Particularly advantageously, the process according to the invention can be integrated into an overall process for the oxidation of an organic substrate with hydrogen peroxide. Accordingly, a process has been found for the catalytic oxidation of an organic substrate from the group comprising olefins, aromatic hydrocarbons which can carry one or more substituents selected from the group comprising alkyl, alkoxy and hydroxyl groups, and carbonyl compounds, with an organic or aqueous-organic hydrogen peroxide solution prepared by direct synthesis in a stainless steel reactor, and wherein, during the reaction to prepare the hydrogen peroxide, at no point does the surface of the stainless steel come into permanent contact with the gaseous mixture passing through the reactor. The oxidation takes place in the presence of an oxidation catalyst from the group comprising titanium silicalites and other vanadium, molybdenum and/or tungsten compounds, preferably in the presence of a titanium silicalite. The organic substrate is preferably an olefin oxidized to the epoxide and particularly preferably propene oxidized to propylene oxide. The oxidation process according to the invention is preferably carried out with a methanolic hydrogen peroxide solution containing 2 to 12 wt. % of water.

The oxidation process according to the invention is distinguished by an improved selectivity of the oxidation reaction and a long life of the oxidation catalyst, especially if a titanium silicalite is used as the catalyst, since interfering transition metal ions enter the oxidation process in only trace amounts because corrosion is avoided in the preparation of the hydrogen peroxide solution.

The invention is illustrated by the Examples and Comparative Examples which follow.

EXAMPLES

Example 1

Direct Synthesis in a Stainless Steel Bubble Column Reactor

Direct synthesis was carried out in a bubble column reactor made of V4A stainless steel (material 1.4571) with an internal diameter of 16 mm and a length of 40 cm. The reactor contained a fixed bed of catalyst with a bulk volume of about 80 ml. The catalyst used was a mixture of catalytically active metal particles and inert particles. Catalytically active particles consisting of 95% of Pd and 5% of Au were prepared analogously to the procedure described in DE 199 12 733. The inert material used was granular alpha-aluminium oxide from Ceramtech AG with the reference "Stemalox spray particles, fired, 0–0.5 mm, 85% $Al_2O_3$ content." Before use, the <0.1 mm fraction was removed from the granules by sieving. The very finely divided metallic catalyst powder was mixed with the oxidic support powder. The Pd content of the mixture of catalyst particles and inert particles was 0.25 wt. %.

The reactor was operated as a flooded bubble column reactor with the gas and liquid flowing in cocurrent, at a pressure of 5 MPa (50 bar) and a reaction temperature of 25° C. The liquid reaction medium used was methanol containing 0.0002 mol/l of sodium bromide and 0.01 mol/l of sulfuric acid. This liquid reaction medium was fed into the bottom end of the reactor at 120 ml/h. The flow velocity of the liquid and the reactor cross section produced a liquid cross-sectional loading of 0.6 m/h. 230 ml/h of a gaseous mixture consisting of 3 vol. % of hydrogen, 20 vol. % of oxygen and 77 vol. % of nitrogen were simultaneously fed into the bottom end of the reactor. The reaction product, together with unreacted gas, was withdrawn from the top end of the reactor in such a way that no gas cushion formed inside the reactor.

After 24 h the $H_2$ conversion was 65%. The $H_2O_2$ selectivity based on the converted $H_2$ was 74%. The $H_2O_2$ concentration at the end of the reactor was 5.2 wt. %. The palladium productivity was 14.1 g $H_2O_2$/g Pd·h.

When the experiment had run for 600 h, the reaction was stopped and the reactor was emptied and examined for corrosion of the reactor material. No corrosion could be found in the reaction zone or in the top part of the reactor.

Example 2 (Comparative Example)

Direct Synthesis in a Hastelloy C Trickle Bed Reactor

Example 1 was repeated except that a Hastelloy C4 (material 2.4610) trickle bed reactor of the same dimensions was used, the liquid reaction medium and the gaseous mixture being fed into the top end of the reactor.

After 24 h the $H_2$ conversion was 69%. The $H_2O_2$ selectivity based on the converted $H_2$ was 70%. The $H_2O_2$ concentration at the end of the reactor was 5.09 wt. %. The palladium productivity was 13.7 g $H_2O_2$/g Pd·h.

After the experiment had run for 500 h, the reaction was stopped and the reactor was emptied and examined for corrosion of the reactor material. In the top part of the reactor, pronounced pitting corrosion was detectable in those areas which had been in permanent contact with the gas phase.

Example 3

Corrosion Tests with Reaction Mixtures from the Direct Synthesis

Corrosion tests were carried out on 60×20 mm V4A stainless steel (material 1.4571) or Hastelloy C4 (material 2.4610) test pieces with a central TIG weld seam, which had been pickled with a mixture of HF and $HNO_3$ before the experiments.

In a closed apparatus at 22–26° C., weighed test pieces were completely immersed (c) or half immersed (h) in a methanolic reaction mixture from the direct synthesis which contained 2.20 wt. % of $H_2O_2$, 0.0002 mol/l of NaBr and 0.0005 mol/l of $H_2SO_4$, the mixture being stirred. After 14 days the test pieces were removed and visually examined for corrosion. They were then cleaned with 20 wt. % $HNO_3$ and reweighed in order to determine the erosion rates due to corrosion. The results of the corrosion tests are collated in Table 1. Pitting corrosion was only observed on those parts of the test pieces which had been in permanent contact with the gas phase forming above the reaction mixture.

TABLE 1

Corrosion after 14 days with 0.0002 mol/l of NaBr and 0.0005 mol/l of $H_2SO_4$

| Material | Test* | Visually detectable corrosion | Erosion g/d · m² | Erosion mm/a |
|---|---|---|---|---|
| 1.4571 | c | none | 0.015 | <0.001 |
| 1.4571 | h | isolated pitting down to 40 μm | 0.025 | 0.001 |
| 2.4610 | h | extensive pitting down to 10–15 μm | 0.005 | <0.001 |

*c = test pieces immersed, h = test pieces half immersed

Example 4

Additional Corrosion Tests

Example 3 was repeated with a methanolic reaction mixture from the direct synthesis which contained 3.63 wt. % of $H_2O_2$, 0.001 mol/l of NaBr and 0.005 mol/l of $H_2SO_4$. The test pieces were removed after 7 days and examined. The results of the corrosion tests are collated in Table 2. Pitting corrosion was only observed on those parts of the test pieces which had been in permanent contact with the gas phase forming above the reaction mixture.

TABLE 2

Corrosion after 7 days with 0.001 mol/l of NaBr and 0.005 mol/l of $H_2SO_4$

| Material | Test* | Visually detectable corrosion | Erosion g/d · m² | Erosion mm/a |
|---|---|---|---|---|
| 1.4571 | c | none | 0.010 | <0.001 |
| 1.4571 | h | extensive pitting down to 70 μm | 0.125 | 0.006 |

*c = test pieces immersed, h = test pieces half immersed

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

What is claimed is:

1. A process for the preparation of an organic or aqueous-organic hydrogen peroxide solution by direct synthesis, comprising passing a non-explosive gaseous mixture and a liquid reaction medium over a fixed bed arranged in a reactor; wherein:
   a) said non-explosive gaseous mixture comprises hydrogen and oxygen;
   b) said liquid reaction medium comprises:
      i) at least one water-soluble organic solvent;
      ii) a bromide and/or iodide in a concentration of $10^{-6}$ to $10^{-2}$ mol/kg; and
      iii) a strong acid in a concentration of 0.0001 to 0.5 mol/kg;

c) said fixed bed comprises supported catalyst particles, or a mixture of catalyst-containing and catalyst-free particles, of a noble metal catalyst, d) said reactor is stainless steel and, during the reaction, the surface of the stainless steel is at no point in permanent contact with the gaseous mixture passing through the reactor.

2. The process of claim 1, wherein said liquid reaction medium is passed over the fixed bed with a cross-sectional loading of 0.3 to 20 m/h.

3. The process of claim 1, wherein said liquid reaction medium is passed over the fixed bed with a cross-sectional loading of 1 to 10 m/h.

4. The process of claim 3, wherein said at least one water-soluble organic solvent is an alcohol selected from the group consisting of: methanol; ethanol; n-propanol; and n-butanol.

5. The process of claim 1, wherein said reactor is operated as a bubble column and said liquid reaction medium is passed through the reactor from bottom to top in such a way that the reactor does not contain a coherent gas phase.

6. The process of claim 5, wherein said liquid reaction medium is passed over the fixed bed with a cross-sectional loading of 0.3 to 20 m/h.

7. The process of claim 5, wherein said liquid reaction medium is passed over the fixed bed with a cross-sectional loading of 1 to 10 m/h.

8. The process of claim 7, wherein said at least one water-soluble organic solvent is an alcohol selected from the group consisting of: methanol; ethanol; n-propanol; and n-butanol.

9. The process of claim 1, wherein said at least one water-soluble organic solvent is an alcohol selected from the group consisting of: methanol; ethanol; n-propanol; and n-butanol.

10. A process for the catalytic oxidation of an organic substrate selected from the group consisting of: olefins; aromatic hydrocarbons optionally substituted with one or more substituents selected from the group consisting of alkyl, alkoxy and hydroxyl; and carbonyl compounds; said process comprising:

a) preparing an organic or aqueous-organic hydrogen peroxide solution by the process of claim 1; and b) oxidizing said organic substrate with said organic or aqueous-organic hydrogen peroxide solution in the presence of an oxidation catalyst selected from the group consisting of: titanium silicalites, vanadium, molybdenum and/or tungsten compounds.

11. The process of claim 10, wherein an olefin is oxidized to an epoxide in the presence of a titanium silicalite as the oxidation catalyst.

12. The process of claim 11, wherein said organic substrate is the olefin propene.

13. The process of claim 10, wherein the reactor in said process of claim 1 is operated as a bubble column and the liquid reaction medium in said process of claim 1 is passed through the reactor from bottom to top in such a way that the reactor does not contain a coherent gas phase.

14. The process of claim 13, wherein said liquid reaction medium is passed over the fixed bed with a cross-sectional loading of 0.3 to 20 m/h.

15. The process of claim 14, wherein said liquid reaction medium is passed over the fixed bed with a cross-sectional loading of 1 to 10 m/h.

16. The process of claim 13, wherein said at least one water-soluble organic solvent is an alcohol selected from the group consisting of: methanol; ethanol; n-propanol; and n-butanol.

17. The process of claim 13, wherein an oletin is oxidized to an epoxide in the presence of a titanium silicalite as the oxidation catalyst.

18. The process of claim 17, wherein said organic substrate is the olefin propene.

19. The process of claim 10, wherein said organic substrate is an aromatic hydrocarbon optionally substituted with one or more substituents selected from the group consisting of alkyl, alkoxy and hydroxyl.

20. The process of claim 19, wherein said oxidation catalyst is a titanium silicalite.

* * * * *